United States Patent Office 3,176,012
Patented Mar. 30, 1965

3,176,012
NOVEL 21-BIS-(HYDROXYMETHYL)-5β-PREG-
NANES AND THEIR PREPARATION
Daniel Bertin, Montrouge, Seine, France, assignor to
Roussel-UCLAF, S.A., Paris, France, a corporation of
France
No Drawing. Filed Feb. 8, 1963, Ser. No. 257,075
Claims priority, application France, Feb. 20, 1962,
888,614
5 Claims. (Cl. 260—239.55)

The invention relates to novel 21-bis-(hydroxymethyl)-5β-pregnanes having the formula:

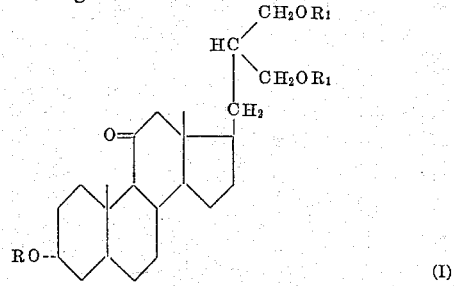

wherein R is selected from the group consisting of hydrogen and an acyl radical of an organic carboxylic acid having 1 to 18 carbon atoms and $R_1$ is selected from the group consisting of hydrogen, an anion of a mineral acid and an acyl radical of an organic carboxylic acid having 1 to 18 carbon atoms. The invention also relates to a process for the preparation of the said 21-bis-(hydroxymethyl)-5β-pregnanes and intermediates formed therein. The invention further relates to novel compositions having coronarodilatatory, peripheric vasodilatatory and anti-spasmodic activity and to a novel method for the treatment of vascular spasms.

The novel 21-bis-(hydroxymethyl)-5β-pregnanes of Formula I possess interesting pharmacological properties, particularly coronarodilatatory, peripheric vasodilatatory and anti-spasmodic activities. The said compounds are useful in the treatment of angina of the chest, of coronaritis, in asthma, bronchial spasms and arterial spasms.

It is an object of the invention to provide the novel 21-bis-(hydroxymethyl)-5β-pregnanes of Formula I.

It is another object of the invention to provide a novel process for the preparation of the 21-bis-(hydroxymethyl)-5β-pregnanes of Formula I.

It is an additional object of the invention to provide novel intermediates for the 21-bis-(hydroxymethyl)-5β-pregnanes of Formula I.

It is a further object of the invention to provide novel compositions having coronarodilatatory, peripheric vasodilatatory and anti-spasmodic activity.

It is another object of the invention to provide a novel method for the treatment of vascular spasms.

These and other objects and advantages of the invention will become obvious from the following detailed description.

The novel 21-bis-(hydroxymethyl)-5β-pregnanes of the invention have the formula

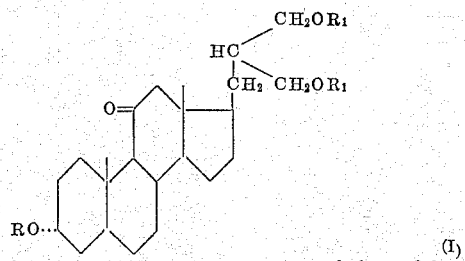

wherein R is selected from the group consisting of hydrogen and an acyl radical of an organic carboxylic acid having 1 to 18 carbon atoms and $R_1$ is selected from the group consisting of hydrogen, an anion of a mineral acid and an acyl radical of an organic carboxylic acid having 1 to 18 carbon atoms.

The acyl radical of the organic carboxylic acid having 1 to 18 carbon atoms may be derived from an aliphatic aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic aid, caproic aid, β-trimethyl propionic acid, heptanoic acid, caprylic acid, pelarginic acid, capric acid, undecylic acid, lauric acid, myristic acid, palymitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic aid; cycloalkyl alkanoic acids, such as cyclopentyl acetic acid, cyclohexyl acetic acid, cyclopentyl propionic acid and cyclohexyl propionic acid; aralalkanoic acids such as phenyl acetic acid and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-keto-alkanoic acids, such as acetylacetic acid, propionylacetic acid and butyrylacetic acid; amino acids such as diethylaminoacetic acid and aspartic acid. The anion of the mineral acid may be derived from mineral acids such as nitric acid, phosphoric acid and sulfuric acid.

The process of the invention for the preparation of the 21-bis-(hydroxymethyl)-5β-pregnanes of Formula I comprises degradating the lateral chain of 5β-pregnane-3α,20β,21-triol-11-one with periodic acid in the presence of a lower alkanol to form the corresponding di-lower alkyl ketal of 17β-formyl-5β-androstane-3α-ol-11-one, reacting the latter with an acylating agent of a lower aliphatic carboxylic acid having 2 to 7 carbon atoms to form the corresponding di-lower alkyl ketal of 3α-acyloxy-17β-formyl-5β-androstane-11-one, hydrolyzing the latter in an aqueous organic solvent under acidic conditions to form 3α-acyloxy-17β-formyl-5β-androstane-11-one, condensing the latter with a lower alkyl cyanoacetate to form the corresponding 3α - acyloxy-21-carbo-lower-alkoxy-21-cyano-$\Delta^{20}$-5β-pregnene-11-one, catalytically hydrogenating the latter to form 3α-acyloxy-21-carbo-lower-alkoxy-21-cyano-5β-pregnane-11-one, reacting the latter under alkaline conditions to form 21-dicarboxy-5β-pregnane-3α-ol-11-one, reacting the latter with a lower alkanol in the presence of a dehydrating agent to form 21-dicarbo-lower-alkoxy-5β-pregnane-3α-ol-11-one, reacting the latter with an alkaline mixed hydride to form 21-bis-(hydroxymethyl)-5β-pregnane-3α,11β-diol, reacting the latter with an acylating agent of an aliphatic carboxylic acid having 2 to 7 carbon atoms to form the corresponding 3α - acyloxy-21-bis-(acyloxymethyl)-5β-pregnane-11β-ol, oxidizing the latter with a sulfochromic acid oxidizing agent to form 3α-acyloxy-21-bis-(acyloxymethyl)-5β-pregnane-11-one, saponifying the latter under alkaline conditions to form 21-bis-(hydroxymethyl)-5β-pregnane 3α-ol-11-one and recovering the latter.

To obtain esters of 21-bis-(hydroxymethyl)-5β-pregnane-3α-ol-11-one of Formula I, the said product is reacted with a compound selected from the group consisting of lower aliphatic ketones, lower aliphatic aldehydes and aryl aliphatic aldehydes to form the corresponding ketonide of 21 - bis - (hydroxymethyl)-5β-pregnane-3α-ol-11- one, esterifying the latter with an esterification agent of an organic carboxylic acid having 1 to 18 carbon atoms to form the ketonide of 3α-acyloxy-21-bis-(hydroxymethyl)-5β-pregnane-11-one, hydrolyzing the latter under acidic conditions to form 3α-acyloxy-21-bis-(hydroxymethyl)-5β-pregnane-11-one, esterifying the latter with an esterification agent of an acid selected from the group consisting of a mineral acid and an organic carboxylic acid having 1 to 18 carbon atoms to form 3α-acyloxy-21-bis-(acyloxymethyl)-5β-pregnane-11-one and recovering the latter. The reaction scheme is illustrated in Table I.

wherein Ac is an acyl radical of a lower aliphatic acid having 2 to 7 carbon atoms, R' is an acyl radical of an organic carboxylic acid having 1 to 18 carbon atoms, $R_2$ is selected from the group consisting of an anion of a mineral acid and an acyl radical of an organic carboxylic acid having 1 to 18 carbon atoms, $R_3$ and $R_4$ are lower alkyl radicals having 1 to 7 carbon atoms, and $R_5$ and $R_6$ may be hydrogen or a lower alkyl radical having 1 to 7 carbon atoms or $R_5$ may be a phenyl group and $R_6$ is then hydrogen.

Examples of suitable reactants to form the ketonide of

TABLE I

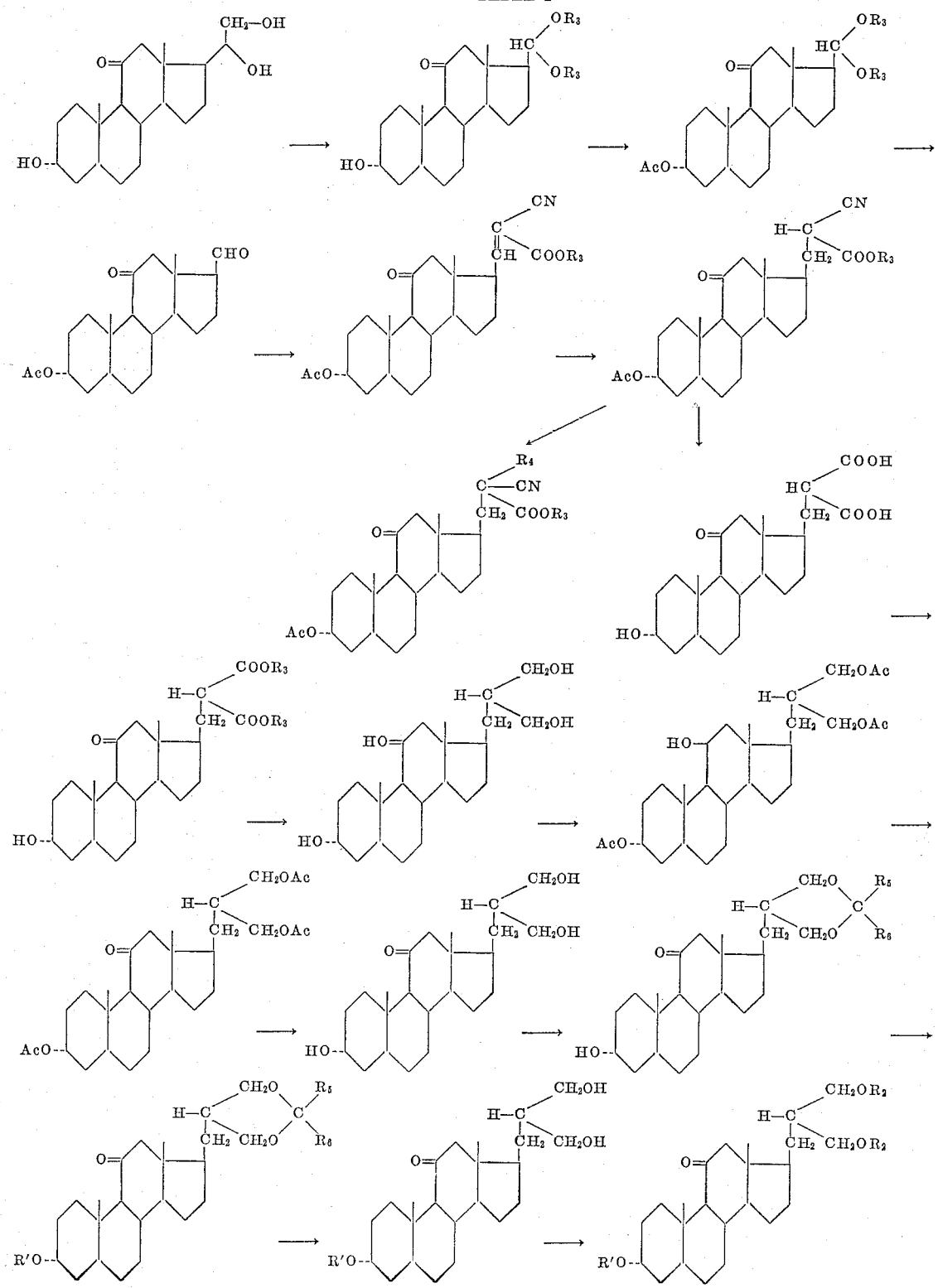

21-bis-(hydroxymethyl) - 5β - pregnane-3α-ol-11-one are aliphatic ketones such as acetone, methylethyl ketone and diethyl ketone, lower aliphatic aldehydes such as formol, acetaldehyde, butyraldehyde, etc. and araliphatic aldehydes such as benzaldehyde, etc.

A preferred mode of the process of the invention for the preparation of 21-bis-(hydroxymethyl)-5β-pregnane-3α-ol-11 - one comprises reacting 5β - pregnane - 3α,20β,21-triol-11-one with periodic acid in the presence of methanol to form the dimethyl ketal of 17β-formyl-5β-androstane-3α-ol-11-one, reacting the latter with acetic acid anhydride in the presence of a base such a pyridine to form the dimethyl ketal of 3α-acetoxy-17β-formyl-5β-androstane-11-one, hydrolyzing the latter in aqueous acetone in the presence of sulfuric acid to form 3α-acetoxy-17β-formyl-5β-androstane-11-one, condensing the latter with ethyl cyanoacetate in the presence of a mixture of acetic acid and piperidine as a catalyst to form 3α-acetoxy-21-carboethoxy-21-cyano-Δ20-5β-pregnene - 11 - one, catalytically hydrogenating the latter in the presence of palladized charcoal to form 3α-acetoxy-21-carbo-ethoxy-21-cyano-5β-pregnane-11-one, reacting the latter with an alkali metal hydroxide such as potassium hydroxide to form 21-dicarboxy-5β-pregnane-3α-ol-11-one, reacting the latter with methanol in the presence of hydrogen chloride to form 21-dicarbomethoxy-5β-pregnane-3α - ol - 11 - one, treating the latter with lithium aluminium hydride to form 21-bis-(hydroxymethyl)-5β-pregnane-3α,11β-diol, esterifying the latter with acetic acid anhydride to form 3α-acetoxy-21-bis-(acetoxymethyl)-5β-pregnane-11β-ol, oxidizing the latter with a sulfuric acid-chromic acid oxidizing agent to form 3α-acetoxy-21-bis-(acetoxymethyl)-5β-pregnane-11-one, saponifying the latter in the presence of an alkali metal hydroxide to form 21-bis-(hydroxymethyl)-5β-pregnane 3α-ol-11-one and recovering the latter.

To form 3α-acetoxy-21-bis-(nitratomethyl) - 5β - pregnane-11-one from 21-bis-(hydroxymethyl)-5β-pregnane-3α-ol-11-one, the latter is preferably reacted with acetone in the presence of perchloric acid to form the acetonide of 21-bis-(hydroxymethyl)-5β-pregnane-3α-ol-11-one, reacting the latter with acetic acid anhydride to form the acetonide of 3α-acetoxy - 21 - bis - (hydroxymethyl) - 5β-pregnane-11-one, hydrolyzing the latter in the presence of a mineral acid such as hydrochloric acid to form 3α-acetoxy-21-bis-(hydroxymethyl)-5β-pregnane-11-one, reacting the latter with fuming nitric acid to form 3α-acetoxy-21-bis-(nitratomethyl)-5β-pregnane-11 - one and recovering the latter.

The novel compositions of the invention having coronarodilatatory, peripheric vasodilatatory and anti-spasmodic activity are comprised of 21-bis-(hydroxymethyl)-5β-pregnane having the formula:

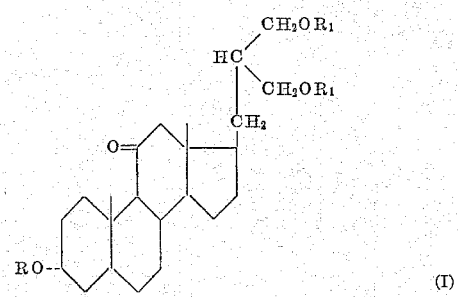

wherein R is selected from the group consisting of hydrogen and an acyl radical of an organic carboxylic acid having 1 to 18 carbon atoms and R₁ is selected from the group consisting of hydrogen, an anion of a mineral acid, an acyl radical of an organic carboxylic acid having 1 to 18 carbon atoms, and an inert pharmaceutical carrier. The compositions may be in the form of injectable suspensions, injectable solutions, prepare in ampules, in multiple-dose flacons, in the form of tablets, of drops and of suppositories prepared in the usual manner.

The novel method of the invention for the treatment of vascular spasms comprises administering an effective amount of a 21-bis-(hydroxymethyl)-5β-pregnane-11-one having the formula:

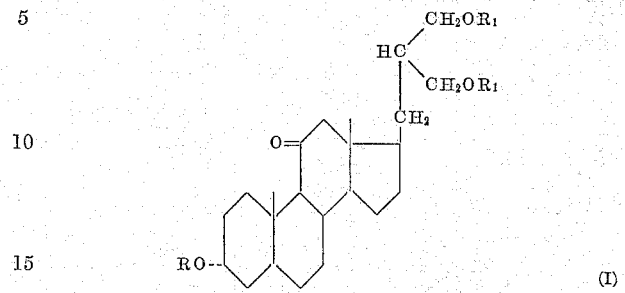

wherein R is selected from the group consisting of hydrogen and an acyl radical of an organic carboxylic acid having 1 to 18 carbon atoms and R₁ is selected from the group consisting of hydrogen, an anion of a mineral acid and an acyl radical of an organic carboxylic acid having 1 to 18 carbon atoms. The usual useful daily dosage is between 20 and 200 mg.

In the following examples there are described several preferred embodiments to illustrate the invention. However, it should be understood that the invention is not intended to be limited to the specific embodiments.

EXAMPLE I.—PREPARATION OF 21-BIS-(HYDROXYMETHYL)-5β-PREGNANE-3α-OL-11-ONE

*Step A.—Preparation of the dimethyl ketal of 17β-formyl-5β-androstane-3α-ol-11-one*

4.760 gm. of 5β-pregnane-3α,20β,21-triol-11-one were introduced under nitrogen and at room temperature into 96 cc. of methanol. Then 7.2 gm. of periodic acid were added and the reaction mixture was held under nitrogen at room temperature for a period of one and a half hours. The reaction mixture was then poured into 300 cc. of water and extracted with ethyl acetate.

The organic extract was washed several times with water and the wash waters were re-extracted with ethyl acetate. Finally, the organic extracts were combined, washed successively with a solution of sodium bicarbonate and with water until the wash waters were neutral. The organic extract was dried over magnesium sulfate and distilled to dryness. The residue was taken up in hot ether, concentrated, iced and the crystals which formed were vacuum filtered. 4.14 gm. of the dimethyl ketal of 17β-formyl-5β-androstane-3α-ol-11-one were obtained which upon purification by recrystallization from isopropyl ether had a melting point of 155° C.

The product was soluble in alcohol and chloroform, slightly soluble in ether and insoluble in water.

*Analysis.*—C₂₂H₃₆O₄: Molecular weight=364.51. Calculated: C, 72.49%; H, 9.96%; O, 17.56%. Found: C, 72.3%; H, 9.9%; O, 17.8%.

This compound is not described in the literature.

The starting compound, 5β-pregnane-3α,20β,21-triol-11-one, was prepared according to the method described by Sarett (J. Am. Chem. Soc., vol. 71, p. 1165 (1949)).

*Step B.—Preparation of 3α-acetoxy-17β-formyl-5β-androstane-11-one*

3.86 gm. of the dimethyl ketal of 17β-formyl-5β-androstane-3α-ol-11-one were introduced into 16 cc. of pyridine and 8 cc. of acetic anhydride and after the resulting solution had stood for a period of 3 hours at room temperature, it was poured under agitation in a mixture of water and ice. The precipitate formed was vacuum filtered, washed with water until the wash waters were neutral and dried. 4.159 gm. of the raw dimethyl ketal of 3α - acetoxy-17β-formyl-5β-androstane-11-one were obtained which were used as such for the following step of the synthesis. This compound is not described in the literature.

4.06 gm. of the dimethyl ketal of 3α-acetoxy-17β-formyl-5β-androstane-11-one were introduced into 160 cc. of aqueous acetone and 4.3 cc. of normal sulfuric acid and the reaction mixture was heated to reflux for a period of about 40 minutes. Then 40 cc. of liquid was rapidly distilled therefrom and the reaction mixture was cooled. 50 cc. of water were added under agitation and the precipitate formed was vacuum filtered. The precipitate was washed with water until the wash waters were neutral and dried. 3.4 gm. of 3α-acetoxy-17β-formyl-5β-androstane-11-one were obtained which upon purification by recrystallization from isopropyl ether had a melting point of 149° C.

This product is soluble in acetone, benzene, chloroform, slightly soluble in alcohol and isopropyl ether and insoluble in water.

*Analysis.*—$C_{22}H_{32}O_4$: Molecular weight=360.48. Calculated: C, 73.29%; H, 8.95%; O, 17.75%. Found: C, 73.1%; H, 8.8%; O, 18.0%.

This compound is not described in the literature.

*Step C.—Preparation of 3α-acetoxy-21-carboethoxy-21-cyano-Δ$^{20}$-5β-pregnene-11-one*

3.4 gm. of 3α-acetoxy-17β-formyl-5β-androstane-11-one were introduced into a solution of 70 cc. of benzene, 3.4 cc. of acetic acid, 0.34 cc. of piperidine and 1.6 cc. of ethyl cyanoacetate. The solution was heated to reflux under nitrogen for a period of 5 hours and then the reaction mixture was poured into a mixture of ice and water. The oily phase was extracted with methylene chloride. The extract was washed successively with a solution of sodium bicarbonate and with water until the wash waters were neutral, dried over magnesium sulfate, treated with animal black, filtered and concentrated under vacuum. The residue was taken up in a mixture of 1 part of petroleum ether and 1 part of isopropyl ether and allowed to stand for crystallization overnight. Then a mixture of 7 parts of isopropyl ether and 3 parts of petroleum ether was added. The crystals formed were vacuum filtered, washed with the above-mentioned mixture and dried. 2.730 gm. of raw 3α-acetoxy-21-carboethoxy-21-cyano-Δ$^{20}$-5β-pregnene-11-one were obtained which were used as such for the following step of the synthesis. The product could be recrystallized from isopropyl ether giving a product having a melting point of 140° C.

The product was soluble in alcohol, acetone, benzene and chloroform, slightly soluble in isopropyl ether, and insoluble in water.

*Analysis.*—$C_{27}H_{37}O_5N$: Molecular weight=455.57. Calculated: C, 71.17%; H, 8.19%; N, 3.07%. Found: C, 71.3%; H, 8.1%; N, 3.4%.

This compound is not described in the literature.

*Step D.—Preparation of 3α-acetoxy-21-carboethoxy-21-cyano-5β-pregnane-11-one*

0.956 gm. of palladized carbon black containing 10% of $Pd(OH)_2$ were placed in suspension in 28.8 cc. of ethanol and hydrogen was introduced until the catalyst was saturated. Then a suspension of 9.56 gm. of 3α-acetoxy-21-carboethoxy-21-cyano-Δ$^{20}$-5β-pregnene-11-one in 160 cc. of ethanol and 0.8 cc. of 0.1 N sodium hydroxide was added thereto. Hydrogen was introduced into this mixture for a period of about 10 minutes. Then the suspension was filtered and the catalyst was washed with ethanol. The filtrate and the ethanol wash liquors were combined and concentrated under vacuum. 9.99 gm. of raw 3α-acetoxy-21-carboethoxy-21-cyano-5β-pregnane-11-one were obtained which was used as such for the following step of the synthesis. This compound is not described in the literature.

3α-acetoxy-21-carboethoxy-21-cyano-5β-pregnane-11-one could be transformed by alkylation with ethyl bromide followed by acylation into 3α-acetoxy-21-carboethoxy-21-cyano-21-ethyl-5β-pregnane-11-one having a melting point of 118° C.

This compound was soluble in acetone, benzene, and chloroform, slightly soluble in alcohol and isopropyl ether, and insoluble in water.

*Analysis.* — $C_{29}H_{43}O_5N$: Molecular weight=485.64. Calculated: C, 71.72%; H, 8.93%; N, 2.88%. Found: C, 72.0%; H, 9.1%; N, 3.0%.

This compound is not described in the literature.

*Step E.—Preparation of 21-dicarboxy-5β-pregnane-3α-ol-11-one*

4.6 gm. of 3α-acetoxy-21-carboethoxy-21-cyano-5β-pregnane-11-one were introduced into 15 cc. of methanol and 10 cc. of a mixture of 50 cc. of water and 40 cc. of 48° Bé. potassium hydroxide solution were added thereto. Next the mixture was heated under agitation in a bath at a temperature of 50° C. After 15 minutes, the rest of the above mixture was added and the solution was heated to 135° C. under agitation and under a nitrogen atmosphere for a period of about 2 hours and 30 minutes. The reaction mixture was cooled to +5° C. and the solution obtained was acidified to a pH of 1 by addition of 50% hydrochloric acid. The precipitate formed was extracted with ethyl acetate. The extracts were washed successively with water and several times with a 10% solution of sodium bicarbonate and then were acidified to a pH of 1 with 50% hydrochloric acid. The precipitate newly formed was re-extracted with ethyl acetate. The extracts were washed with water, dried over magnesium sulfate, filtered and concentrated under vacuum to a volume of about 20 cc. The solution was iced and the crystalline precipitate vacuum filtered. The precipitate was washed with ethyl acetate and dried. 3.55 gm. of raw 21-dicarboxy-5β-pregnane-3α-ol-11-one having a melting point of 230–235° C. (with decomposition) were obtained. The product as such was used for the following stage of the synthesis.

This compound was soluble in alcohol, acetone and dilute aqueous alkalis, moderately soluble in ethyl acetate, and insoluble in water, ether, benzene, chloroform and dilute aqueous acids. This compound is not described in the literature.

*Step F.—Preparation of 21-dicarbomethoxy-5β-pregnane-3α-ol-11-one*

3.635 gm. of 21-dicarboxy-5β-pregnane-3α-ol-11-one were introduced into a solution of 8% hydrochloric acid in methanol and the reaction mixture was heated to reflux for a period of about one hour. Then the solution was cooled and poured into a mixture of water and ice. The precipitate formed was extracted with methylene chloride. The extract was washed successively with water, with a 10% solution of sodium bicarbonate and again with water until the wash waters were neutral. The extract was then dried over magnesium sulfate, filtered and concentrated to dryness. The residue was taken up with isopropyl ether, heated to reflux and then iced. The crystals formed were vacuum filtered and dried. 3.242 gm. of 21-dicarbomethoxy-5β-pregnane-3α-ol-11-one having a melting point of 129–130° C. were obtained which could be purified by recrystallization from ether.

The product was soluble in alcohol, acetone, benzene and chloroform, slightly soluble in ether, and insoluble in water.

*Analysis.*—$C_{25}H_{38}O_6$: Molecular weight=434.55. Calculated: C, 69.10%; H, 8.82%. Found: C, 69.0%; H, 8.7%.

This compound is not described in the literature.

Step C.—Preparation of 3α-acetoxy-21-bis-(hydroxymethyl)-5β-pregnane-11-one

All of the acetonide of 3α-acetoxy-21-bis-(hydroxymethyl)-5β-pregnane-11-one obtained in Step B was taken up with 5 cc. of methanol. 0.1 cc. of 6 N hydrochloric acid were added at room temperature. The reaction mixture was agitated at room temperature for about one hour and poured into water. The precipitate formed was extracted several times with methylene chroride and the extracts were combined and washed successively with a dilute solution of sodium bicarbonate and with water until the wash waters were neutral. The washed extract was dried over sodium sulfate and concentrated to dryness under vacuum. The residue was subjected to chromatography through magnesium silicate with elution with methylene chloride containing 3% and 5% of methanol and 290 mg. of raw 3α-acetoxy-21-bis-(hydroxymethyl)-5β-pregnane-11-one were obtained. After purification by trituration with isopropyl ether, the product had a melting point of 138° C.

This product was soluble in chloroform, quite soluble in ether, slightly soluble in isopropyl ether, and insoluble in water. This compound is not described in the literature.

EXAMPLE III.—PREPARATION OF 3α-ACETOXY-21-BIS-(NITRATOMETHYL) - 5β - PREGNANE-11-ONE 1.5 cc. of fuming nitric acid were introduced slowly under an atmosphere of nitrogen into 4.5 cc. of acetic acid anhydride, cooled to −20° C. Then 225 mg. of 3α-acetoxy-21-bis-(hydroxymethyl) - 5β - pregnane-11-one were added at a temperature of −15° C. in one amount and the reaction mixture was agitated successively for a period of 10 minutes at −15° C., for a period of 10 minutes at −10° C. and for a period of 10 minutes at −6° C. The reaction mixture was then poured into a mixture of water and ice and agitated for a period of 45 minutes while allowing the temperature to mount to +15° C. The precipitate formed was vacuum filtered and washed with water until the wash waters were neutral. The precipitate was taken up with methylene chloride and the methylene chloride solution was dried over sodium sulfate, filtered and concentrated to dryness under vacuum. The product obtained was purified by subjecting the residue to chromatography through magnesium silicate. The column was eluted with benzene containing 1% of methanol and 260 mg. of raw 3α-acetoxy-21-bis-(nitratomethyl)-5β-pregnane-11-one were obtained which were recrystallized from ethanol.

Purification was effected by solution in a mixture of ether and methylene chloride, treatment with animal black, filtration and evaporation to dryness. The residue was taken up in hot ethanol and crystallized by cooling. 125 mg. of 3α-acetoxy-21-bis-(nitratomethyl)-5β-pregnane-11-one having a melting point of 80° C. (slow) and 95° C. on the Kofler block and having a specific rotation $[\alpha]_D^{20} = +60.5° ±5°$ (c.=0.3% in chloroform) were obtained.

The product was soluble in chloroform, ether, slightly soluble in alcohol, and insoluble in water.

*Analysis.*—$C_{25}H_{38}O_9N_2$: Molecular weight=510.57. Calculated: C, 58.80%; H, 7.5%. Found: C, 58.9%; H, 7.5%.

The infrared spectrum showed the presence of a non-conjugated ketone, the presence of the acetate group, the presence of a band at 1641 cm.$^{-1}$ with a shoulder at 1648 cm.$^{-1}$ corresponding to the group:

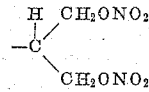

This compound is not described in the literature.

Various other esters of 21-bis-(hydroxymethyl)-5β-pregnane-3α-ol-11-one can be made in a fashion analogous to the processes illustrated in Examples II and III.

PHARMACOLOGICAL DATA

A. 3α-acetoxy-21-bis-(nitratomethyl)-5β-pregnane-11-one (1) *Action on the coronary blood flow.*—The study of the action of 3α-acetoxy-21-bis-(nitratomethyl)-5β-pregnane-11-one on coronary blood flow was effected on the isolated rabbit heart by utilizing a technique inspired by Langendorff, Arch. Gesam. Physiol., 1895, 61, 291). In this method the heart was suspended by the aorta connected to a canula and the coronary system was perfused by means of this canula under a constant pressure of 5 cm. of mercury with Locke serum at a pH of 7.2 to 7.3 heated to 37° C.

The compounds studied were placed in solution in ethanol. This solution was diluted by means of Locke serum to the desired concentrations. A three-way stop cock permitted the instaneous change from normal Locke serum to serum containing the product studied. On the proper equipment the coronary blood flow was registered and parallelly the ventricular contractions.

The minimal concentration of the said compound which clearly augmented the coronary blood flow of such a preparation was systematically determined and the results obtained with 3α-acetoxy-21-bis-(nitratomethyl)-5β-pregnane-11-one as well as trinitrine and papaverine under the same experimental conditions are reported in Table II.

TABLE II

| Compound studied | Minimal active concentration in μg. per cc. in the perfusion liquid | Increase of cornoary blood flow in percent of normal blood flow | Duration of action in minutes | Effect on the ventricular contractions, percent | |
|---|---|---|---|---|---|
| | | | | On the amplitude | On the frequency |
| Trinitrine | 1 | 10 | 2 to 20 | 0 | −5 |
| Papaverine | 10 | 20 | 15 | 0 | 0 |
| 3α-acetoxy-21-bis-(nitratomethyl)-5β-pregnane-11-one | 0.01 | 20 to 30 | >30 | 0 | 0 |

(2) *Determination of spasmolytic effect on the isolated guinea pig intestine.*—The spasmolytic action of 3α-acetoxy-21-bis-(nitratomethyl-5β-pregnane-11-one was studied with reference to the three principal contracting agents (barium chloride, histamine and acetylcholine) and compared with that of papaverine hydrochloride. The identical experimental conditions for the three tests were as follows:

The isolated testinal loop of the guinea pig was suspended in an isolated organ container containing 10 cc. of Tyrode liquid, oxygenated and maintained at 37° C. A submaximal contraction of the intestine was provoked by adding to the Tyrode liquid the contracturing agent at a convenient concentration and the concentration of the active product provoking the decontraction of the organ was determined. The minimum concentration of the active product capable to inhibit the appearance of contracture due to the spasmogenic agent was also determined.

The submaximal contraction of the intestine was obtained with 200γ/cc. of barium chloride, with 0.02γ/cc. of acetylcholine, and with 0.005γ/cc. of histamine. The results obtained with 3α-acetoxy-21-bis-(nitratomethyl)-5β-pregnane-11-one as well as those obtained with papaverine hydrochloride are reported in Table III.

*Step G.—Preparation of 21-bis-(hydroxymethyl)-5β-pregnane-3α,11β-diol*

2.3 gm. of lithium aluminum hydride were introduced over a period of 5 minutes at 15–20° C. into 60 cc. of tetrahydrofuran and a solution of 2 gm. of 21-dicarbomethoxy-5β-pregnane-3α-ol-11-one in 45 cc. of tetrahydrofuran were added. The reaction mixture was agitated under a nitrogen atmosphere at room temperature for a period of about 5½ hours. Next the excess of the hydride was destroyed by the slow addition of ethyl acetate. 50 cc. of a saturated solution of sodium chloride were added slowly and the organic phase which separated was washed with a saturated solution of sodium chloride, dried over magnesium sulfate, filtered and concentrated to dryness.

1.825 gm. of raw 21-bis-(hydroxymethyl)-5β-pregnane-3α,11β-diol were obtained which was used as such for the following step of the synthesis.

This compound was soluble in ethyl acetate. This compound is not described in the literature.

*Step H.—Preparation of 3α-acetoxy-21-bis-(acetoxymethyl)-5β-pregnane-11β-ol*

1.825 gm. of 21-bis-(hydroxymethyl)-5β-pregnane-3α,11β-diol were dissolved in 14 cc. of pyridine. After 5.25 cc. of acetic acid anhydride were added, the reaction mixture was allowed to stand at rest at room temperature for a period of about 3 hours. Then the said mixture was poured into a mixture of water and ice and the precipitate formed was extracted with methylene chloride. The extract was washed successively with 2 N hydrochloride acid, with water, with an aqueous solution of sodium bicarbonate and with water until the wash waters were neutral. The washed extract was dried over magnesium sulfate and concentrated to dryness. 2.26 gm. of raw 3α-acetoxy-21-bis-(acetoxymethyl)-5β-pregnane-11β-ol were obtained which was used as such for the following step of the synthesis. The product could be purified by subjecting it to chromatography through magnesium silicate with elution with methylene chloride containing 1% of methanol.

The product was soluble in ether and chloroform and insoluble in water. This compound is not described in the literature.

*Step I.—Preparation of 3α-acetoxy-21-bis-(acetoxymethyl)-5β-pregnane-11-one*

1.7 gm. of raw 3α-acetoxy-21-bis-(acetoxymethyl)-5β-pregnane-11β-ol were dissolved under agitation at room temperature in 68 cc. of acetone. Then the solution obtained was cooled to +5° C. and 1 cc. of a sulfochromic acid solution consisting of 13.36 gm. of chromic acid anhydride, 11.5 cc. of concentrated sulfuric acid and sufficient water to make 50 cc. of solution was added. The temperature was allowed to rise to +10° C. and then 0.5 cc. of the above mixture was added. After a half hour of agitation at a temperature between +10 and +15° C., the excess of the oxidant was destroyed by the addition of 8 cc. of methanol. The agitation was continued for a period of about 15 minutes. Then the solution was neutralized by the addition of sodium bicarbonate. A further period of agitation of 20 minutes preceded the treatment of the solution under agitation with animal black. The solution was then filtered and a small amount of pyridine was added. The solution was concentrated. The residue obtained in the form of an oil was subjected to chromatography through magnesium silicate with elutions of methylene chloride containing 1% of methanol. 1.247 gm. of raw 3α-acetoxy-21-bis-(acetoxymethyl)-5β-pregnane-11-one were obtained which was used as such for the following step of the synthesis.

The product was soluble in acetone and chloroform. This compound is not described in the literature.

*Step J.—Preparation of 21-bis-(hydroxymethyl)-5β-pregnane-3α-ol-11-one*

1.247 gms. of 3α-acetoxy-21-bis-(acetoxymethyl)-5β-pregnane-11-one were dissolved at reflux in 12.5 cc. of ethanol. A solution of 1.83 cc. of concentrated sodium hydroxide solution and 2.5 cc. of water was added. The reaction mixture was maintained at reflux for a period of 20 minutes and was then poured into a mixture of water and ice. The cooled solution was extracted with ethyl acetate. The extract was washed successively with 25% hydrochloric acid, with water, with a solution of sodium bicarbonate and again with water until the wash waters were neutral. The washed extract was dried over magnesium sulfate, filtered and evaporated to dryness. The residue was taken up in isopropanol. The product was made to crystallize by the addition of ethyl acetate. The crystals obtained were vacuum filtered and dried. Then two successive crystallizations were made from ethyl acetate and 389 mg. of 21-bis-(hydroxymethyl)-5β-pregnane-3α-ol-11-one having a melting point of 162–163° C. on the Kofler block and a specific rotation $[\alpha]_D^{20} = +68.3°$ (c.=0.5% in ethanol) were obtained.

This product was soluble in alcohol, slightly soluble in acetone and chloroform, and insoluble in water, ether, benzene and propylene glycol.

*Analysis.*—$C_{23}H_{38}O_4$: Molecular weight=378.53. Calculated: C, 72.98%; H, 10.12%. Found: C, 73.2%; H, 10.0%.

This compound is not described in the literature.

21-bis-(hydroxymethyl)-5β-pregnane-3α-ol-11-one can be esterified in the form of simple, double or mixed esters of organic and mineral acids, such as 3α-acetoxy-21-bis-(nitratomethyl)-5β-pregnane-11-one and 3α-acetoxy-21-bis-(hydroxymethyl)-5β-pregnane-11-one.

EXAMPLE II.—PREPARATION OF 3α-ACETOXY-21-BIS-(HYDROXYMETHYL)-5β-PREGNANE-11-ONE

*Step A.—Preparation of the acetonide of 21-bis-(hydroxymethyl)-5β-pregnane-3α-ol-11-one*

400 mg. of 21-bis-(hydroxymethyl)-5β-pregnane-3α-ol-11-one were placed in suspension at 20–25° C. in 18 cc. of acetone and 0.05 cc. of a 65% solution of perchloric acid was then added. The reaction mixture was agitated for a period of 2½ hours at room temperature. The solution obtained was neutralized by the addition of sodium carbonate in excess and the agitation was continued for a period of another hour. Then the reaction mixture was filtered and the filtrate was concentrated under vacuum in the presence of a small amount of pyridine. 536 mg. of the raw acetonide of 21-bis-(hydroxymethyl)-5β-pregnane-3α-ol-11-one were thus obtained which were used as such for the next step of the synthesis. This compound is not described in the literature.

*Step B.—Preparation of the acetonide of 3α-acetoxy-21-bis-(hydroxymethyl)-5β-pregnane-11-one*

The raw acetonide of 21-bis-(hydroxymethyl)-5β-pregnane-3α-ol-11-one obtained in Step A was taken up with 4 cc. of pyridine and 2 cc. of acetic acid anhydride were added to the solution under an atmosphere of nitrogen. The reaction mixture was agitated for a period of 2 hours at room temperature and then was added to ice. The precipitate formed was extracted several times with methylene chloride and the extracts were combined, washed successively with 2 N hydrochloric acid, with water, with a dilute solution of sodium bicarbonate and again with water until the wash waters were neutral. The washed extract was dried over magnesium sulfate and concentrated to dryness under vacuum. 557 mg. of the raw acetonide of 3α-acetoxy-21-bis-(hydroxymethyl)-5β-pregnane-11-one were obtained which were used as such for the next step of the synthesis. This compound is not described in the literature.

TABLE III

| Compound studied | Concentration of compound studied expressed in γ/cc. of the bath producing: D—The decontraction of the contracted organ. I—The inhibition of the action of the contracturing agent. | | | | | |
| --- | --- | --- | --- | --- | --- | --- |
| | Tyrode + BaCl₂ | | Tyrode + acetylcholine | | Tyrode + histamine | |
| | D | I | D | I | D | I |
| Papaverine hydrochloride | 20 | 30 | 15 | 20 | 10–15 | 15 |
| 3α-acetoxy-21-bis-(nitratomethyl)-5β-pregnane-11-one | 20 | 20 | 10 | 15 | 10 | 20 |

It can be seen from Table III that the spasmolytic action of the active product was comparable or superior to that of papaverine.

B. *21-bis-(hydroxymethyl)-5β-pregnane-3α-ol-11-one*

The spasmolytic effect of 21-bis-(hydroxymethyl)-5β-pregnane-3α-ol-11-one was studied on the contracture of the isolated small intestine loop of the guinea pig under the same conditions as above. The activity of the compound was found to be at least equal to that of papaverine hydrochloride under the same conditions.

Various modifications of the process and compositions of the invention may be made without departing from the spirit or scope thereof and it is to be understood that the invention is intended to be limited only as defined in the appended claims.

I claim:
1. A compound having the formula

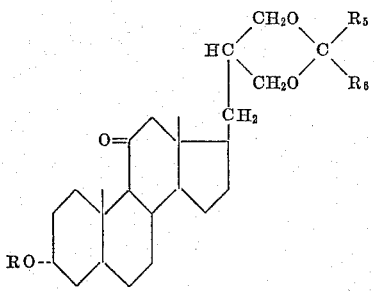

wherein $R_5$ and $R_6$ are selected from the group consisting of hydrogen and lower alkyl having 1 to 7 carbon atoms and when $R_5$ is phenyl, $R_6$ is hydrogen and R is selected from the group consisting of hydrogen and acyl of an organic carboxylic acid having 1 to 18 carbon atoms.

2. A process for the preparation of 21-bis-(hydroxymethyl)-5β-pregnanes having the formula

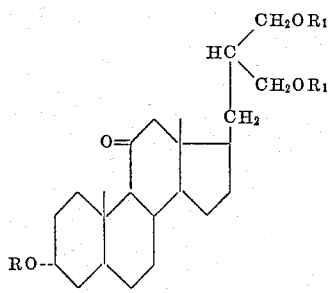

wherein R is selected from the group consisting of hydrogen and acyl of an organic carboxylic acid having 1 to 18 carbon atoms and $R_1$ is selected from the group consisting of hydrogen, an anion of a mineral acid and an acyl of an organic carboxylic acid having 1 to 18 carbon atoms which comprises degradating the lateral chain of 5β-pregnane-3α,20β,21-triol-11-one with periodic acid in the presence of a lower alkanol to form the corresponding di-lower alkyl ketal of 17β-formyl-5β-androstane-3α-ol-11-one, reacting the latter with an acylating agent of a lower aliphatic carboxylic acid having 2 to 7 carbon atoms to form the corresponding di-lower alkyl ketal of 3α-acyloxy-17β-formyl-5β-androstane-11-one, hydrolyzing the latter in an aqueous organic solvent under acidic conditions to form 3α-acyloxy-17β-formyl-5β-androstane-11-one, condensing the latter with a lower alkyl cyanoacetate to form the corresponding 3α-acyloxy-21-carbo-lower-alkoxy-21-cyano-Δ²⁰-5β-pregnene-11-one, catalytically hydrogenating the latter to form 3α-acyloxy-21-carbo-lower-alkoxy-21-cyano-5β-pregane-11-one, reacting the latter under alkaline conditions to form 21-dicarboxy-5β-pregnane-3α-ol-11-one, reacting the latter with a lower alkanol in the presence of a dehydrating agent to form 21-dicarbo-lower-alkoxy-5β-pregnane-3α-ol-11-one, reacting the latter with lithium aluminum hydride to form 21-bis-(hydroxymethyl)-5β-pregnane-3α,11β-diol, reacting the latter with an acylating agent of an aliphatic carboxylic acid having 2 to 7 carbon atoms to form the corresponding 3α-acyloxy-21-bis-(acyloxymethyl)-5β-pregnane-11β-ol, oxidizing the latter with a sulfochromic acid oxidizing agent to form 3α-acyloxy-21-bis-(acyloxymethyl)-5β-pregnane-11-one, saponifying the latter under alkaline conditions to form 21-bis-(hydroxymethyl)-5β-pregnane-3α-ol-11-one and recovering a compound of the above formula.

3. The process of claim 2 wherein 21-bis-(hydroxymethyl)-5β-pregnane-3α-ol-11-one is reacted with a compound selected from the group consisting of lower aliphatic ketones, lower aliphatic aldehydes and araliphatic aldehydes to form the corresponding ketonide of 21-bis-(hydroxymethyl)-5β-pregnane-3α-ol-11-one, esterifying the latter with an acylating agent of an organic carboxylic acid having 1 to 18 carbon atoms to form the ketonide of 3α-acyloxy-21-bis-(hydroxymethyl)-5β-pregnane-11-one, hydrolyzing the latter under acidic conditions to form 3α-acyloxy-21-bis-(hydroxymethyl)-5β-pregnane-11-one, esterifying the latter with an esterification agent of an acid selected from the group consisting of a mineral acid and an organic carboxylic acid having 1 to 18 carbon atoms to form 3α-acyloxy-21-bis-(acyloxymethyl)-5β-pregnane-11-one and recovering the latter.

4. A process for the preparation of 21-bis-(hydroxymethyl)-5β-pregnane-3α-ol-11-one comprising reacting 5β-pregnane-3α-20β,21-triol-11-one with periodic acid in the presence of methanol to form the dimethyl ketal of 17β-formyl-5β-androstane-11-one, condensing the latter with acetic acid anhydride to form the dimethyl ketal of 3α-acetoxy-17β-formyl-5β-androstane-11-one, hydrolyzing the latter under acidic conditions to form 3α-acetoxy-17β-formyl-5β-androstane-11-one, condensing the latter with ethyl cyanoacetate in the presence of a mixture of acetic acid and piperidine to form 3α-acetoxy-21-carboethoxy-21-cyano-Δ²⁰-5β-pregnene-11-one, catalytically hydrogenating the latter in the presence of a palladium catalyst to form 3α-acetoxy-21-carboethoxy-21-cyano-5β-pregnane-11-one, reacting the latter with an alkali metal hydroxide to form 21-dicarboxy-5β-pregnane-3α-ol-11-one, reacting the latter with methanol in the presence of a dehydrating agent to form 21-dicarbomethoxy-5β-pregnane-3α-ol-11-one, treating the latter with lithium aluminum hydride to form 21-bis-(hydroxymethyl-5β-pregnane-3α,11β-diol, esterifying the latter with acetic acid anhydride to form 3α-acetoxy-21-bis-(acetoxymethyl)-5β-pregnane-11β-ol, oxidizing the latter with a sulfuric acid-chromic acid oxidizing agent to form 3α-acetoxy-21-bis-(acetoxymethyl)-5β-pregnane-11-one, saponifying the latter in the presence of an alkali metal hydroxide to form 21-bis-(hydroxymethyl)-5β-pregnane-3α-ol-11-one and recovering the latter.

5. A process for the preparation of 3α-acetoxy-21-bis-(nitratomethyl)-5β-pregnane-11-one comprising reacting 21-bis-(hydroxymethyl)-5β-pregnane-3α-ol-11-one with acetone in the presence of perchloric acid to form the acetonide of 21-bis-(hydroxymethyl)-5β-pregnane-3α-ol-11-one, reacting the latter with acetic acid anhydride to form the acetonide of 3α-acetoxy-21-bis-(hydroxymethyl)-5β-pregnane-11-one, hydrolyzing the latter under acidic conditions to form 3α-acetoxy-21-bis-(hydroxymethyl)-5β-pregnane-11-one, reacting the latter with fuming nitric acid to form 3α-acetoxy-21-bis-(nitratomethyl)-5β-pregnane-11-one and recovering the latter.

References Cited by the Examiner

UNITED STATES PATENTS 2,540,964   2/51   Sarett _____ 260—397.4

OTHER REFERENCES

Bertin et al.: Bull. Soc. Chim., pages 1555–60 (1962).
Velluz et al.: Compt. Rend. 254, pages 42–46, January 1962.

LEWIS GOTTS, *Primary Examiner.*

UNITED STATES PATENT OFFICE
CERTIFICATE OF CORRECTION

Patent No. 3,176,012                            March 30, 1965

Daniel Bertin

It is hereby certified that error appears in the above numbered patent requiring correction and that the said Letters Patent should read as corrected below.

Column 2, line 17, for "aid" read -- acid --; column 5, line 73, for "prepare" read -- prepared --; column 14, line 51, for "-androstane-11-one, condensing" read -- -androstane-3α-ol-11-one, reacting --.

Signed and sealed this 10th day of May 1966.

(SEAL)
Attest:

ERNEST W. SWIDER                                    EDWARD J. BRENNER
Attesting Officer                                         Commissioner of Patents